United States Patent [19]

Dienes et al.

[11] Patent Number: 4,487,617

[45] Date of Patent: Dec. 11, 1984

[54] MECHANISM FOR CLEANING AND DRYING COMPRESSED GASES

[75] Inventors: Larry E. Dienes, North Ridgeville; David J. Knight, Avon Lake; William R. Wurst, Lorain, all of Ohio

[73] Assignee: The Bendix Corporation, Southfield, Mich.

[21] Appl. No.: 525,186

[22] Filed: Aug. 22, 1983

[51] Int. Cl.³ ............................................. B01D 53/04
[52] U.S. Cl. ...................................... 55/163; 55/387; 55/DIG. 17
[58] Field of Search ................... 55/33, 163, 208, 267, 55/269, 316, 319, 387, DIG. 17, 274, 275

[56] References Cited

U.S. PATENT DOCUMENTS

| | | | |
|---|---|---|---|
| 2,593,132 | 4/1952 | Gannon | 55/316 X |
| 2,698,061 | 12/1954 | Jaubert | 55/316 |
| 3,029,581 | 4/1962 | Robbins | 55/316 |
| 3,171,726 | 3/1965 | Roney et al. | 55/387 X |
| 3,464,186 | 9/1969 | Hankison et al. | 55/163 |
| 3,472,000 | 10/1969 | Glass et al. | 55/163 |
| 3,483,677 | 12/1969 | Pinto | 55/316 |
| 3,680,283 | 8/1972 | Jones, Jr. | 55/387 X |
| 3,705,480 | 12/1972 | Wireman | 55/316 X |
| 3,796,025 | 3/1974 | Kasten | 55/316 |
| 3,832,831 | 9/1974 | Ritchie et al. | 55/316 X |
| 3,934,990 | 1/1976 | Ide | 55/269 X |
| 4,052,178 | 10/1977 | Frantz | 55/DIG. 17 |
| 4,071,337 | 1/1978 | Evans | 55/387 X |
| 4,131,442 | 12/1978 | Frantz | 55/387 |
| 4,261,715 | 4/1981 | Frantz | 55/316 X |
| 4,398,929 | 8/1983 | Segersten | 55/163 |

Primary Examiner—Robert Spitzer
Attorney, Agent, or Firm—Ken C. Decker; W. N. Antonis

[57] ABSTRACT

Mechanism for cleaning and drying compressed gas (10) includes a housing (12) having an open end closed by an end cover (14). A desiccant canister (16) is mounted on a plate (24) which is clamped between the end cover (14) and the housing (12) so that the canister (16) is received within the housing (12). A circuitous passage (78) communicates an inlet port (76) with a sump cavity (68) which is communicated with the canister (16). Heat is transferred from the gas to the walls of the passage (78) as the gas passes therethrough. The passage (78) cants toward the sump (68) so that moisture tends to drain into the latter. A dump valve (110) periodically communicates the sump cavity (68) with atmosphere to thereby regenerate the desiccant in the canister (16) and to void the contaminants from the sump cavity (68).

12 Claims, 3 Drawing Figures

MECHANISM FOR CLEANING AND DRYING COMPRESSED GASES

This invention relates to a mechanism for cleaning and drying compressed gasses and, more particularly, relates to an air dryer for cleaning and drying compressed air in a vehicle air brake system.

Air dryers have been used to dry the air in a vehicle air brake system for many years. The advantages of clean and dry air in such an air brake system have long been recognized, as moisture entrained in the air brake system may during cold weather operation cause the components of the air brake system to freeze, thus rendering the system inoperable. These prior art air dryers normally include a desiccant material through which the compressed air flows. A small quantity of air is stored in a purge volume after the compressed air flows through the desiccant material. When the vehicle air compressor has charged the vehicle air reservoirs to a sufficient pressure level, the compressor is unloaded so that the compressor no longer compresses air. When the compressor is unloaded, a signal is transmitted to a dump valve carried within the air dryer which causes air stored in the purge volume to backflow through the desiccant at a controlled rate to regenerate the desiccant. A typical prior art air dryer for automotive air brake systems is disclosed in U.S. Pat. No. 3,464,186, issued Sept. 2, 1969 to Hankison et al.

However, air dryers are not efficient if the incoming air is too warm or if the incoming air contains large quantities of water or oil droplets or other contaminants. Since operation of the air compressor in compressing air inherently raises the temperature of the air and produces contaminants, prior art devices either tolerated the inefficiency of attempting to clean and remove moisture from very warm contaminate air or they used complicated cooling, separating and filtering devices upstream of the air dryer.

Furthermore, the desiccant which removes moisture from the air is usually housed in a canister. Since the desiccant can become unusable because of contamination, it is necessary to replace the desiccant canister from time to time as the air dryer is used. Prior art air dryers ae difficult to service, because connecting air lines must be disconnected in order to remove the desiccant canister. Furthermore, the various ports, valves, etc., were provided on different parts of the prior art air dryers, and are easily damaged when the desiccant canister is replaced.

The device of the present invention avoids the drawbacks of the prior art because the desiccant canister used in the present invention contains a filter and is mounted on a plate which is clamped between the open end of a housing which receives the desiccant canister and an end cover. All of the necessary porting, valving, etc., are located in the end cover and remain intact when the air dryer desiccant canister is serviced. A circuitous path communicates the inlet or supply port of the air dryer with a sump which feeds the air into the desiccant canister. This circuitous path is designed with several overlapping segments interconnected by 180° bends so that communication of the air through this path not only cools the air, but also causes large droplets of water, oil or other contaminants to separate and collect on the walls of the passage. The circuitous passage cants toward the sump, so that the water, oil and other contaminants tend to collect in the sump. A dump valve is communicated with the sump, so that when the dump valve is actuated to regenerate the desiccant, the moisture or other contaminants which collect in the sump are voided from the air dryer along with the moisture collected in the dessicant and the filter.

Other features and advantages of our invention will appear in the following description with reference to the accompanying drawings in which.

Figure 1:
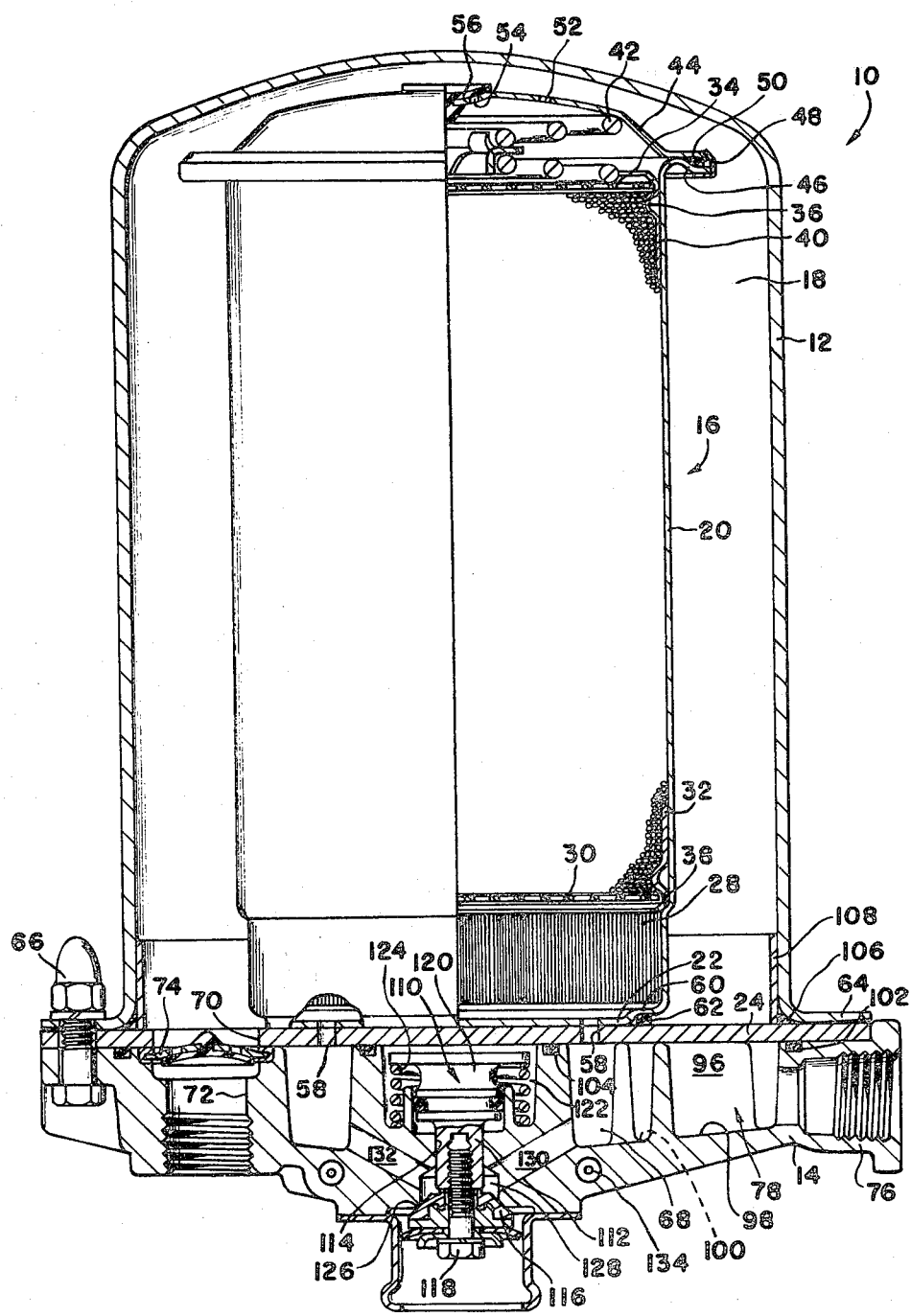
FIG. 1 is a longitudinal cross-sectional view of a mechanism for cleaning and drying compressed gasses made pursuant to the teachings of our present invention.
Figure 2:
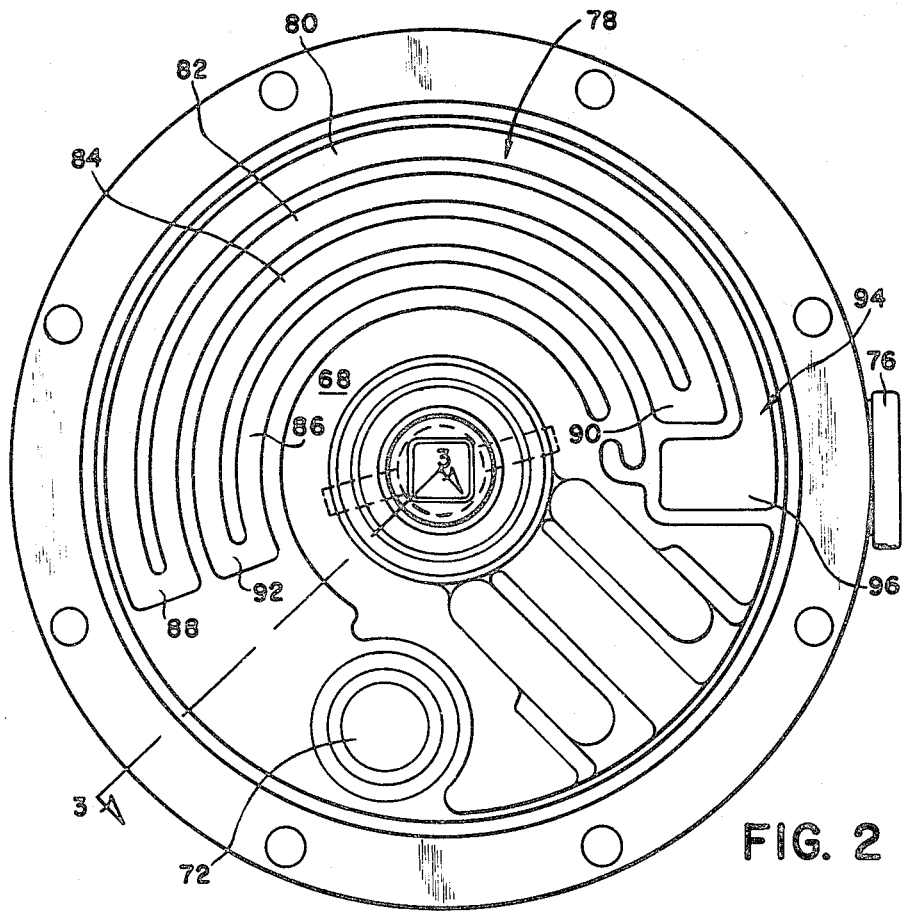
FIG. 2 is a transverse view of the end cover used in our invention with the housing and plate removed; taken substantially along lines 2—2 of FIG. 1.
Figure 3:
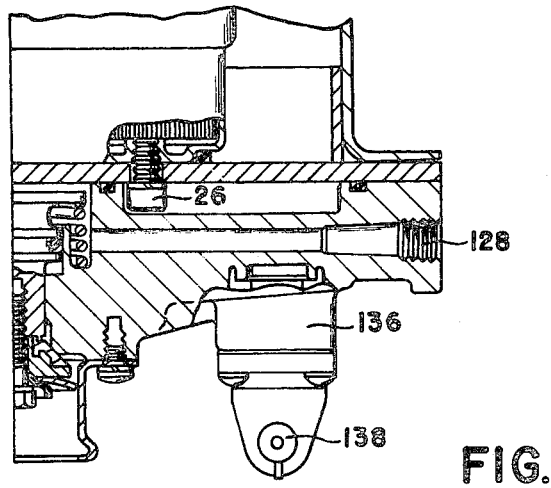
FIG. 3 is a cross-sectional view taken substantially along lines 3—3 of FIG. 2.

Referring now to the drawings, a cleaner and dryer for compressed gasses generally indicated by the numeral 10 includes an open ended housing 12 and an end cover 14 which closes the open end of the housing 12. A desiccant canister 16 is received within the housing 12 and cooperates with the latter to define a gas receiving cavity 18 therebetween. The desiccant canister 16 includes a cylindrical housing 20 having a closed end 22 that is secured to a plate 24 by fasteners 26. A conventional metal mesh filter element 28 is installed within the lower portion of the housing 20 viewing FIG. 1. A screen 30 is attached to a circumferentially extending skirt 32 and is installed in the housing 20 downstream of the filter element 28. Another screen 34 is attached to a circumferentially extending skirt 36 at the opposite end of the canister housing 20. The circumferentially extending shoulder 38 circumscribes the housing 20 and acts as a stop for the skirt 32. Desiccant material 40 fills the volume within the canister housing 20 between the screens 30, 34. A pair of springs 42 yieldably urge the screen 34 downwardly viewing FIG. 1, to thereby exert pressure on the desiccant material 40, to keep the desiccant particles compacted against one another.

The end of the housing 20 opposite the closed end 22 is closed by a closure member 44 which is clamped to a lip 46 on the housing 20 by a circumferentially extending clamping member 48. The clamping member 48 wedges a seal 50 between the cover member 44 and the lip 46 to form an air-tight connection. A metered opening 52 is provided in the closure member 44 and permits restricted flow of gas to and from the gas receiving cavity 18. Flow through a larger opening 54, which is sufficiently large to permit unrestricted flow, is controlled by a check valve 56 which permits flow into the gas receiving cavity 18 from the interior of the canister housing 20, but which prevents flow in the reverse direction. An inlet passage comprising openings 58 in the plate 24 and in the closed end 22 of the housing 20 permit compressed gas to communicate into the housing 20. The closed end 22 of the housing 20 is provided with a circumferentially extending recess 60 in which a circumferentially extending seal 62 is disposed. One side of the seal 62 is exposed to the pressure level in the gas receiving cavity 18 and the other side of the seal 62 is exposed to the pressure of the compressed gas communicating into openings 58 through the interface between the closed end 22 of the housing 20 and the plate 24. When the pressure differential across the seal 62 exceeds a predetermined level which is indicative of a clogged condition of the filter 28 or desiccant 40 inside the canister housing 20, the seal 62 distorts to permit gas to by-pass the desiccant canister 16 and communicate directly into the gas receiving cavity 18.

The plate 24 on which the desiccant canister 16 is installed is clamped between a circumferentially extending lip 64 on the housing 12 and the end cover 14 by circumferentially spaced bolts 66. The bolts 66 are so located as to ensure that outlet passage 70 in the end plate 24 is brought into registry with the outlet or delivery port 72 defined within the end cover 14. A check valve 74 is installed within the outlet or delivery port 72 and permits fluid communication from the gas receiving chamber 18 into the delivery port 72, but prevents communication in the reverse direction.

The sump cavity 68 is communicated with an inlet or supply port 76 defined in the end cover 14 by a circuitous passage generally indicated by the numeral 78. The circuitous path 78 comprises overlapping segments 80, 82, 84 and 86 which are interconnected by 180° bends 88, 90 and 92. The entrance 94 into the first segment 80 communicates with a recess or pocket 96 which communicates with the inlet port 76. Accordingly, compressed gas communicated through the inlet port 76 must be deflected or turned by the walls of the pocket 96 into the entrance 94, but heavier contaminant particles will tend to collect in the pocket. As can best be seen in FIG. 1, the segments 80–86 are canted as at 98, 100, so that the bottom walls of the segments 80–86 form a downwardly spiraling ramp which terminates in the sump cavity 68. Heat is transferred from the incoming gas to the walls of the circuitous passage 78 as the compressed gas travels therethrough, thereby cooling the gas. The upper wall of the circuitous passage 78 is defined by the plate 24, which is provided with circumferentially extending seals 102, 104 between the end cover 14 and the plate 24. A circumferentially extending seal 106 is provided between the housing 12 and the plate 24, which is kept in place by circumferentially extending retainer 108.

A dump valve generally indicated by the numeral 110 consists of a square-shaped plunger 112 which is slidably received in a square hole or passage 114. A circumferentially extending valve member 116 is secured to one end of the plunger 112 by a bolt 118. A piston 120 is integral with the other end of the plunger 112 and is received within a chamber 122. A spring 124 yieldably urges the piston 120, and therefore the plunger 112, upwardly viewing FIG. 1, to maintain the valve member 116 in sealing engagement with circumferentially extending valve seat 126. The chamber 122 is communicated with a control port 128 so that when the pressure of the control port 128 is above a predetermined level, the piston 120 is forced downwardly viewing FIG. 1, opening the valve 116 from the valve seat 126. When the pressure control port 120 is less than the predetermined pressure level, the spring 124 closes the dump valve 110.

The dump valve 110 controls communication from a cavity 128 and the exterior of the air dryer 10. A pair of channels 130, 132 communicate the sump cavity 68 with the cavity 128. In order to assure that freezing weather will not cause water to freeze within the end cover 14 during operation of the air dryer, thereby rendering the air dryer and particularly the dump valve 110 inoperative, an electrical resistance heater is provided. The heater comprises a conventional electrical resistance wire 134 which is connected to a conventional thermostat heater control 136. Power is supplied to the control 136 from an external power source through conventional connecter assembly 138.

In operation, assuming the gas dryer 10 is used to clean and dehumidify compressed air in a vehicle air braking system, the outlet of the aforementioned air compressor is connected to the inlet or supply port 76 of the air dryer 10. Air communicated to the supply port 76 flows into the pocket 96 and is deflected into the entrance 94 of the circuitous path 78. Of course, the heavier water and oil droplets and other foreign matter contaminating the air, because of their momentum, tend to separate and collect in the pocket 96 and at bends 88, 90 and 92. The contact of the air with the side walls of the circuitous path 78 causes heat to be drained from the air into the side walls. As the temperature of the air is decreased, moisture and oil vapor condense from the air onto the side walls, and drain into the sump cavity 68 because of the canted or sloping nature of the bottom walls of the path 78 which form a downwardly sloping ramp terminating in the sump cavity 68. The compressed air communicated into the sump cavity 68 is then communicated through the passages 58 into the desiccant canister 16. Additional water, oil and other contaminate particles are removed by the filter element 28, and the compressed air thereafter communicates through the screen 30 and into the bed of the desiccant material 40. The desiccant material 40 absorbs the entrained water vapor from the compressed air, which thereafter flows out of the desiccant container 16 through the openings 52 and 56 and into the gas receiving cavity 18. Compressed air from the gas receiving cavity 18 is communicated through the check valve 74 to the delivery or outlet port 72 and from there into a reservoir (not shown).

After the air compressor compresses a sufficient quantity of air to charge the aforementioned reservoir (not shown) to the desired pressure level, a conventional unloader (not shown) communicates a pressure signal to the compressor causing the latter to stop compressing air. The aforementioned pressure signal is also communicated to the control port 128 of the dryer mechanism 10. The pressure at the control port 128 is communicated into the chamber 122 where it acts on piston 120 to urge the latter downwardly viewing FIG. 1. Downward movement of the piston 120 forces the valve 116 away from the valve seat 126, thereby venting the channels 130, 132 and the sump cavity 68 to void the contaminants such as water and oil residue that have drained into the sump cavity 68 as explained hereinabove. The reduction of the pressure level in the sump cavity 68 also exhausts the compressed air in the desiccant canister 16, which rapidly depressurizes the latter, carrying out the moisture, oil droplets and other contaminates entrained on the desiccant material 40 and the filter element 28. Thereafter, while the valve 110 remains open, air stored in the gas receiving cavity 18 bleeds through the orifice or opening 52 to gradually desorb the moisture previously absorbed in the desiccant bed 40. The check valve 74, of course, protects compressed air in the aforementioned downstream reservoir from being bled back into the gas receiving cavity 18 as the latter is gradually depressurized. The check valve 56 prevents flow of air through the opening 54, to assure that the regeneration of the desiccant bed 40 will take place at a controlled, even rate by bleeding air through the orifice 52. Of course, when the pressure in the aforementioned reservoir drops below a predetermined level, caused, for example, by use of the vehicle's air brake system, the compressor again begins to compress air and the signal communicated to the control port 128 is terminated, thereby permitting the spring 124 to re-close the valve member 116 against the seat 126, so that the air dryer 10 can thereafter clean and dry the compressed air as discussed hereinabove.

Although the invention has been described as it relates to its use in a vehicle air brake system, those skilled in the art will appreciate that many other applications are possible, and that gasses other than air may be treated. For example, the invention may be used in gas fractionalization systems. Accordingly, the scope of the invention is to be limited only by the scope of the claims that follow.

We claim:

1. Mechanism for cleaning and drying compressed gasses comprising an open ended housing, a desiccant canister in said housing, and an end cover closing the open end of said housing, said end cover defining a sump cavity therewithin, an inlet port carried by said end cover and communicated with a source of compressed gas, a circuitous passage communicating the inlet port with the sump cavity, said desiccant canister cooperating with said housing to define a gas receiving cavity therebetween, a delivery port carried by said end cover and communicating with said gas receiving cavity, passage means communicating the sump cavity with the desiccant canister, and dump valve means for controlling communication between said sump cavity and a region maintained at a pressure level lower than the pressure level in said sump cavity when compressed gas is communicated to the inlet port, said dump valve means being responsive to a pressure signal for controlling communication between said sump cavity and said region, said circuitous passage being defined by side walls and a bottom wall, said bottom wall canting from said inlet port towards said pump cavity whereby contaminants tend to drain toward said sump cavity, said circuitous passage including segments overlapping one another connected by bends at the ends of said segments.

2. Mechanism for cleaning and drying compressed gasses as claimed in claim 1, wherein said inlet port communicates with a pocket defined in said end cover, said circuitous passage defining an entrance communicating with said pocket, said entrance being oriented such that gas entering said inlet port is deflected into said entrance.

3. Mechanism for cleaning and drying compressed gasses as claimed in claim 1, wherein said passage means is oriented with respect to the sump cavity such that gas flowing into the sump cavity from the circuitous passage is deflected into said passage means by the walls of the sump cavity.

4. Mechanism for cleaning and drying compressed gasses as claimed in claim 1, wherein said region is the ambient atmosphere, said end cover including a channel communicating said sump cavity with ambient atmosphere and a control port communicated to a source of control pressure, said dump valve being responsive to the pressure level at said control port to control communication through said channel.

5. Mechanism for cleaning and drying compressed gasses as claimed in claim 4, wherein said desiccant canister is mounted on a plate, means clamping said plate between the housing and the end cover, said passage means being defined by openings in said end cover and in said desiccant canister, said clamping means orienting said plate with respect to said end cover, and means carried by said end cover and by said housing sealingly engaging said plate.

6. Mechanism for cleaning and drying compressed gasses as claimed in claim 1, wherein said desiccant canister is mounted on a plate, means clamping said plate between the housing and the end cover, said passage means being defined by openings in said end cover and in said desiccant canister, said clamping means orienting said plate with respect to said end cover, and means carried by said end cover and by said housing sealingly engaging said plate.

7. Mechanism for cleaning and drying compressed gasses comprising an open ended housing, a desiccant canister in said housing, and an end cover closing the open end of said housing, said end cover defining a sump cavity therewithin, an inlet port carried by said end cover and communicated with a source of compressed gas, a circuitous passage communicating the inlet port with the sump cavity, said desiccant canister cooperating with said housing to define a gas receiving cavity therebetween, a delivery post carried by said end cover and communicating with said gas receiving cavity, passage means communicating the sump cavity with the desiccant canister, and dump valve means for controlling communication between said sump cavity and a region maintained at a pressure level lower than the pressure level in said sump cavity when compessed gas is communicated to the inlet port, said dump valve means being responsive to a pressure signal for controlling communication between said sump cavity and said region, said region being the ambient atmosphere, said end cover including a channel communicating said sump cavity with ambient atmosphere and a control port communicated to a source of control pressure, said dump valve being responsive to the pressure level at said control port to control communication through said channel, said desiccant canister being mounted on a plate, means clamping said plate between the housing and the end cover, said passage means being defined by openings in said plate and in said desiccant canister, said clamping means orienting said plate with respect to said end cover, and sealing means carried by said housing sealingly engaging said plate, said desiccant canister cooperating with said plate to receive said sealing means therebetween, said sealing means being exposed to the pressure levels in said passage means and in said gas receiving cavity and normally preventing communication therebetween, said sealing means distorting when the pressure level in said passage means exceeds the pressure level in said gas receiving cavity by more than a predetermined amount indicative of a clogged condition of said desiccant canister to permit the pressure in the passage means to by-pass said desiccant canister and communicate directly into the gas receiving cavity.

8. Mechanism for cleaning and drying compressed gasses comprising an open ended housing, a desiccant canister in said housing, and an end cover closing the open end of said housing, said end cover defining a sump cavity therewithin, an inlet port carried by said end cover and communicated with a source of compressed gas, a circuitous passage communicating the inlet port with the sump cavity, said desiccant canister cooperating with said housing to define a gas receiving cavity therebetween, a delivery port carried by said end cover and communicating with said gas receiving cavity, passage means communicating the sump cavity with the desiccant canister, and dump valve means for controlling communication between said sump cavity and a region maintained at a pressure level lower than the pressure level in said sump cavity when compressed gas is communicated to the inlet port, said dump valve means being responsive to a pressure signal for controlling communication between said sump cavity and said region, said desiccant canister being mounted on a plate, means clamping said plate between the housing and the end cover, said passage means being defined by openings in said plate and in said desiccant canister, said clamping means orienting said plate with respect to said end cover, and sealing means carried by said housing sealingly engaging said plate, said desiccant canister cooperating with said plate to receive said sealing means therebetween, said sealing means being exposed to the pressure levels in said passage means and in said gas receiving cavity and normally preventing communication therebetween, said sealing means distorting when the pressure level in said passage means exceeds the pressure level in said gas receiving cavity by more than a predetermined amount indicative of a clogged condition of said desiccant canister to permit the pressure in the passage means to by-pass said desiccant canister and communicate directly into the gas receiving cavity.

9. Mechanism for cleaning and drying compressed gasses comprising an open ended housing, an end cover for closing the end of said housing, a plate, a desiccant canister mounted on said plate, means clamping said plate between the end cover and the housing, said desiccant canister extending from said plate into said housing and cooperating with the walls of the latter to define a gas receiving cavity therebetween, an inlet port, a delivery port, and a control port mounted in said end cover, first passage means through said end cover and said plate and into the desiccant canister for communicating said inlet port with said desiccant canister, second passage means communicating said delivery port with said gas receiving cavity, said clamping means orienting said plate so that the portion of the second passage means extending through the plate is brought into registry with the corresponding portion extending through the end cover, and dump valve means responsive to the pressure level at said control port for controlling communication between said first passage means and a region maintained at a pressure level lower than the pressure level in said first passage means when compressed gas is communicated to said inlet port, said desiccant canister cooperating with said plate to receive a circumferentially extending seal therebetween, said seal being exposed to the pressure levels in said first passage means and in said gas receiving cavity and normally preventing communication therebetween, said seal distorting when the pressure level in said first passage means exceeds the pressure in said gas receiving cavity by more than a predetermined amount indicative of a clogged condition of said desiccant canister to permit the pressure in the first passage means to by-pass said desiccant canister and communicate directly into the gas receiving cavity.

10. Mechanism for cleaning and drying compressed gas as claimed in claim 9, wherein said region is the ambient atmosphere, said end cover including a channel communicating said first passage means with ambient atmosphere, said dump valve means controlling communication through said channel.

11. Mechanism for cleaning and drying compressed gasses comprising an open ended housing, an end cover for closing the end of said housing, a plate, a desiccant canister mounted on said plate, means clamping said plate between the end cover and the housing, said desiccant canister extending from said plate into said housing and cooperating with the walls of the latter to define a gas receiving cavity therebetween, an inlet port, a delivery port, and a control port mounted in said end cover, first passage means through said end cover and said plate and into the desiccant canister for communicating said inlet port with said desiccant canister, second passage means communicating said delivery port with said gas receiving cavity, said clamping means orienting said plate so that the portion of the second passage means extending through the plate is brought into registry with the corresponding portion extending through the end cover, and dump valve means responsive to the pressure level at said control port for controlling communication between said first passage means and a region maintained at a pressure level lower than the pressure level in said first passage means when compressed gas is communicated to said inlet port, pressure differential responsive means being provided between said first passage means and said gas receiving cavity normally preventing communication therebetween but being responsive to a differential between the first passage means and said gas receiving cavity of more than a predetermined amount indicative of a clogged condition of said desiccant canister to permit the pressure in the first passage means to by-pass said desiccant canister and communicate directly into the gas receiving cavity.

12. Mechanism for cleaning and drying compressed gasses comprising an open ended housing, a desiccant canister in said housing, and an end cover closing the open end of said housing, said end cover defining a sump cavity therewithin, an inlet port carried by said end cover and communicated with a source of compressed gas, a circuitous passage communicating the inlet port with the sump cavity, said desiccant canister cooperating with said housing to define a gas receiving cavity therebetween, a delivery port carried by said end cover and communicating with said gas receiving cavity, passage means communicating the sump cavity with the desiccant canister, and dump valve means for controlling communication between said sump cavity and a region maintained at a pressure level lower than the pressure level in said sump cavity when compressed gas is communicated to the inlet port, said dump valve means being responsive to a pressure signal for controlling communication between said sump cavity and said region, said circuitous passage including segments overlapping one another connected by bends at the ends of said segments.

* * * * *